US012154536B2

(12) United States Patent
Hsu et al.

(10) Patent No.: US 12,154,536 B2
(45) Date of Patent: Nov. 26, 2024

(54) ACTIVE NOISE CONTROL CIRCUIT WITH MULTIPLE FILTERS CONNECTED IN PARALLEL FASHION AND ASSOCIATED METHOD

(71) Applicant: Airoha Technology Corp., Hsinchu (TW)

(72) Inventors: Chao-Ling Hsu, Hsinchu County (TW); Li-Wen Chi, Hsinchu County (TW); Shih-Kai He, New Taipei (TW)

(73) Assignee: Airoha Technology Corp., Hsinchu (TW)

( * ) Notice: Subject to any disclaimer, the term of this patent is extended or adjusted under 35 U.S.C. 154(b) by 169 days.

(21) Appl. No.: 17/978,239

(22) Filed: Nov. 1, 2022

(65) Prior Publication Data

US 2023/0335100 A1 Oct. 19, 2023

Related U.S. Application Data

(60) Provisional application No. 63/331,239, filed on Apr. 14, 2022.

(51) Int. Cl.
*G10K 11/178* (2006.01)

(52) U.S. Cl.
CPC .. *G10K 11/17815* (2018.01); *G10K 11/17817* (2018.01); *G10K 11/17823* (2018.01);
(Continued)

(58) Field of Classification Search
CPC ....... G10K 11/17853; G10K 11/17854; G10K 11/17873; G10K 11/17875;
(Continued)

(56) References Cited

U.S. PATENT DOCUMENTS 6,449,369 B1 * 9/2002 Carme ............. G10K 11/17854 381/71.13
8,693,700 B2 4/2014 Bakalos
(Continued)

FOREIGN PATENT DOCUMENTS

CN 102113346 A 6/2011
CN 103475336 A 12/2013
(Continued)

OTHER PUBLICATIONS

Wallace, Parallel Adaptive Filter Structures for Acoustic Noise Cancellation, pp. 525-528, 1992 IEEE International Symposium on Circuits and Systems , 1992.

*Primary Examiner* — Kile O Blair
(74) *Attorney, Agent, or Firm* — Winston Hsu

(57) ABSTRACT

An active noise control (ANC) circuit is used for generating an anti-noise signal, and has a plurality of filters including at least one first filter and at least one second filter. The at least one first filter generates at least one first filter output, wherein each of the at least one first filter has a first filter type. The at least one second filter generates at least one second filter output, wherein each of the at least one second filter has a second filter type different from the first filter type. The anti-noise signal is jointly controlled by the at least one first filter output and the at least one second filter output. The at least one first filter and the at least one second filter are connected in a parallel fashion.

19 Claims, 8 Drawing Sheets

(52) U.S. Cl.
CPC .. *G10K 11/17825* (2018.01); *G10K 11/17881* (2018.01); *G10K 2210/1081* (2013.01); *G10K 2210/30232* (2013.01); *G10K 2210/3026* (2013.01); *G10K 2210/3027* (2013.01); *G10K 2210/3028* (2013.01); *G10K 2210/3044* (2013.01)

(58) Field of Classification Search
CPC ....... G10K 11/17879; G10K 11/17881; G10K 2210/3026; G10K 2210/3027; G10K 2210/3042
See application file for complete search history.

(56) References Cited

U.S. PATENT DOCUMENTS

| | | | |
|---|---|---|---|
| 8,718,289 | B2 | 5/2014 | Shridhar |
| 8,737,636 | B2 | 5/2014 | Park |
| 9,076,431 | B2 | 7/2015 | Kamath |
| 2019/0324433 | A1 | 10/2019 | Cella |

FOREIGN PATENT DOCUMENTS

| | | | |
|---|---|---|---|
| CN | 111656436 | A | 9/2020 |
| TW | 202105916 | A | 2/2021 |

* cited by examiner

ACTIVE NOISE CONTROL CIRCUIT WITH MULTIPLE FILTERS CONNECTED IN PARALLEL FASHION AND ASSOCIATED METHOD

CROSS REFERENCE TO RELATED APPLICATIONS

This application claims the benefit of U.S. Provisional Application No. 63/331,239, filed on Apr. 14, 2022. The content of the application is incorporated herein by reference.

BACKGROUND OF THE INVENTION

1. Field of the Invention

The present invention relates to noise reduction/cancellation, and more particularly, to an active noise control circuit with multiple filters connected in a parallel fashion and an associated method.

2. Description of the Prior Art

Active noise control (ANC) can cancel the unwanted noise based on the principle of superposition. Specifically, an anti-noise signal of equal amplitude and opposite phase is generated and combined with the unwanted noise signal, thus resulting in cancellation of both noise signals at a local quite zone (e.g. user's ear drum). Compared to a static ANC technique using filter coefficients that are tuned and fixed in a factory, an adaptive ANC technique is capable of finding better filter coefficients for individuals with different wearing styles. However, the stability of the adaptive ANC technique is worse than that of the static ANC technique, and the control difficulty and complexity of the adaptive ANC technique is higher than that of the static ANC technique. More specifically, the static ANC technique is easy to design and control the ANC filter, and has stable performance if an earphone (e.g., an earbud) is well fit. However, the static ANC technique is sensitive to individuals and different wearing styles/habits. Regarding the adaptive ANC technique, it is robust to individuals and different wearing styles/habits, and has better performance if the earphone (e.g., earbud) is not well fit. However, the adaptive ANC technique needs sophisticated control of the ANC filter, and may produce side effects due to an incorrect transfer function adaptively adjusted under false control.

Thus, there is a need for an innovative ANC design which is capable of combining the static ANC technique and the adaptive ANC technique to achieve better ANC performance and user experience.

SUMMARY OF THE INVENTION

One of the objectives of the claimed invention is to provide an active noise control circuit with multiple filters connected in a parallel fashion and an associated method.

According to a first aspect of the present invention, an exemplary active noise control (ANC) circuit for generating an anti-noise signal is disclosed. The exemplary ANC circuit has a plurality of filters, including at least one first filter and at least one second filter. The at least one first filter is arranged to generate at least one first filter output, wherein each of the at least one first filter has a first filter type. The at least one second filter is arranged to generate at least one second filter output, wherein each of the at least one second filter has a second filter type different from the first filter type. The anti-noise signal is jointly controlled by the at least one first filter output and the at least one second filter output. The at least one first filter and the at least one second filter are connected in a parallel fashion.

According to a second aspect of the present invention, an exemplary active noise control (ANC) method for generating an anti-noise signal is disclosed. The exemplary ANC method includes: utilizing at least one first filter and at least one second filter connected in a parallel fashion to obtain at least one first filter output of the at least one first filter and at least one second filter output of the at least one second filter, wherein each of the at least one first filter has a first filter type, and each of the at least one second filter has a second filter type different from the first filter type; and generating the anti-noise signal by combining the at least one first filter output and the at least one second filter output.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names.

This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
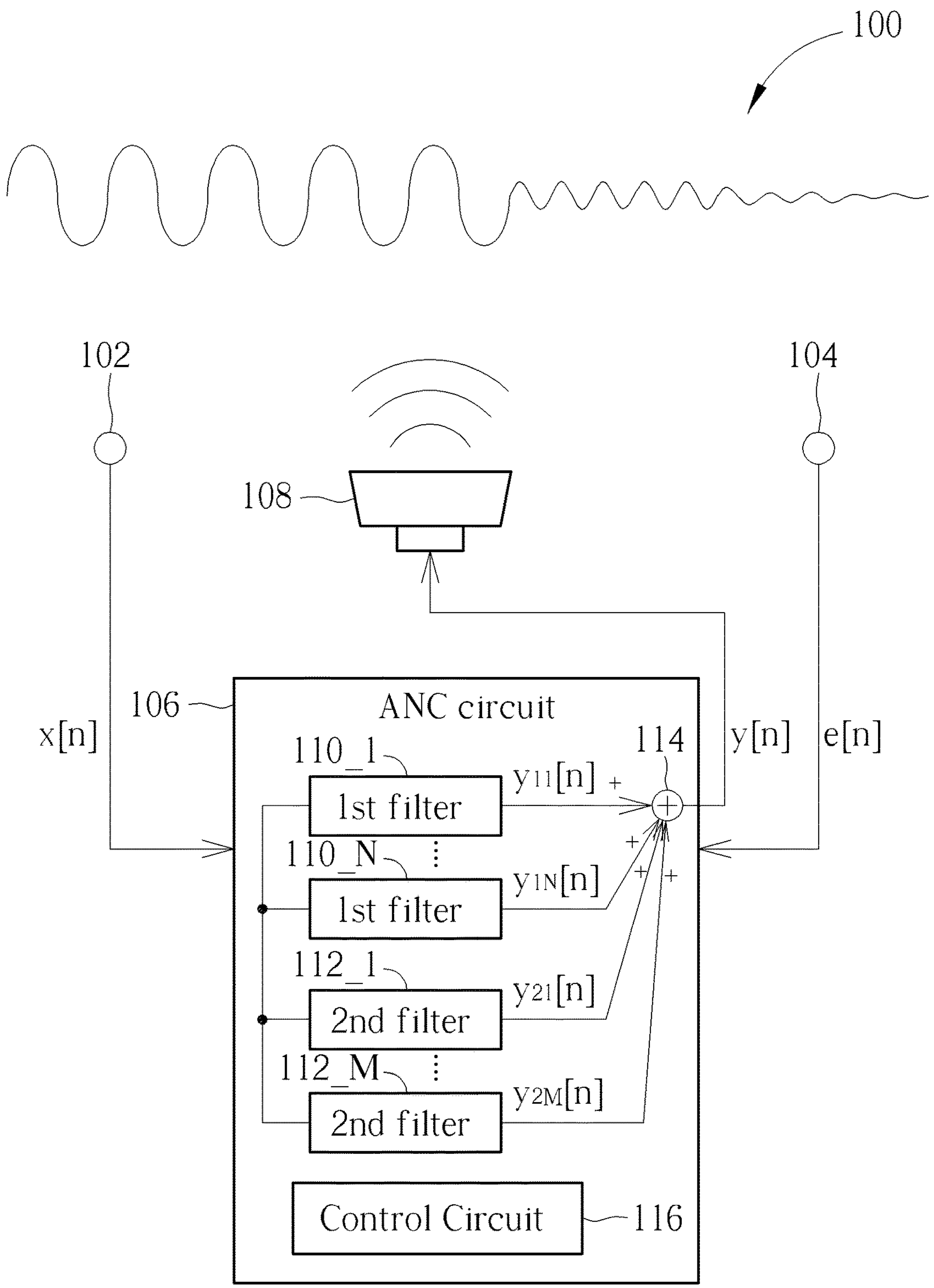
FIG. 1 is a schematic diagram illustrating an active noise control (ANC) system according to an embodiment of the present invention.

FIG. 1 is a schematic diagram illustrating an active noise control (ANC) system according to an embodiment of the present invention. The adaptive ANC system 100 may be installed on an earphone such as an earbud. In this embodiment, the adaptive ANC system 100 includes a reference microphone 102, an error microphone 104, an ANC circuit 106, and a cancelling loudspeaker 108. One of the reference microphone 102 and the error microphone 104 may be optional, depending upon an ANC structure employed by the ANC circuit 106. The ANC circuit 106 is arranged to generate an anti-noise signal y[n] for noise reduction/cancellation. Specifically, the anti-noise signal y[n] may be a digital signal that is transmitted to the cancelling loudspeaker 108 for playback of analog anti-noise, where the analog anti-noise is intended to reduce/cancel the unwanted ambient noise through superposition. The reference microphone 102 is arranged to pick up ambient noise from an external noise source, and generate a reference signal x[n]. The error microphone 104 is arranged to pick up remnant noise resulting from noise reduction/cancellation, and generate an error signal e[n]. One or both of the reference signal x[n] and the error signal e[n] may be used by the ANC circuit 106, depending upon the ANC structure employed by the ANC circuit 106.

In this embodiment, the ANC circuit 106 has a plurality of filters, including one or more first filters 110_1-110_N (N≥1) and one or more second filters 112_1-112_M (M≥1), where M and N are positive integers, and M may be equal to or different from N. The number of first filters 110_1-110_N and the number of second filters 112_1-112_M can be adjusted, depending upon actual design considerations. For example, the ANC circuit 106 may include only a single first filter 110_1 (N=1). For another example, the ANC circuit 106 may include only a single second filter 112_1 (M=1). For yet another example, the ANC circuit 106 may include only a single first filter 110_1 (N=1) and only a single second filter 112_1 (M=1). Each of the first filters 110_1-110_N (N≥1) has a first filter type. Each of the second filters 112_1-112_M (M≥1) has a second filter type that is different from the first filter type. For example, each of the first filters 110_1-110_N (N≥1) is a static ANC filter with fixed filter coefficients and fixed frequency response, and each of the second filters 112_1-112_M (M≥1) is an adaptive ANC filter with adaptively adjusted filter coefficients and variable frequency response. In a case where adaptive ANC filter (s) are used by the ANC circuit 106, the ANC circuit 106 further includes a control circuit 116 that is arranged to adaptively adjust filter coefficients of each adaptive ANC filter. For example, the control circuit 116 may include one ANC filter controller for each adaptive ANC filter, and the ANC filter controller may update filter coefficients of the adaptive ANC filter by using a least mean squares (LMS) algorithm, a normalized LMS (NLMS) algorithm, a filtered-x LMS (Fx-LMS) algorithm, or a recursive least squares (RLS) algorithm. Since details of LMS algorithm, NLMS algorithm, Fx-LMS algorithm, and RLS algorithm are known to those skilled in the pertinent art, further description is omitted here for brevity.

The ANC circuit 106 has a parallel ANC filter design. As shown in FIG. 1, the first filters 110_1-110_N (N≥1) and the second filters 112_1-112_M (M≥1) are connected in a parallel fashion. The first filters 110_1-110_N (N≥1) are arranged to generate first filter outputs $y_{11}[n]$-$y_{1N}[n]$ (N≥1) as anti-noise outputs, respectively. The second filters 112_1-112_M (M≥1) are arranged to generate second filter outputs $y_{21}[n]$-$y_{2M}[n]$ (M≥1) as anti-noise outputs, respectively. In this embodiment, the anti-noise signal y[n] output from the ANC circuit 106 is jointly controlled by the first filter outputs $y_{11}[n]$-$y_{1N}[n]$ (N≥1) and the second filter outputs $y_{21}[n]$-$y_{2M}$ [n] (M≥1). For example, the ANC circuit 106 further includes a combining circuit (e.g., an adder) 114 that is arranged to combine the first filter outputs $y_{11}[n]$-$y_{1N}[n]$ (N≥1) and the second filter outputs $y_{21}[n]$-$y_{2M}[n]$ (M≥1) for generating the anti-noise signal y[n]. A single filter usually has limitations to approach the ideal ANC filter. Using more filters is a way to minimize the difference between the designed ANC filter and the ideal ANC filter. Based on such observation, the present invention proposes a parallel ANC filter design that benefits from advantages of first filters 110_1-110_N (e.g., static ANC filter(s)) and advantages of second filters 112_1-112_M (e.g., adaptive ANC filter(s)), reduces the design complexity, and offers more design flexibility.

Figure 2:
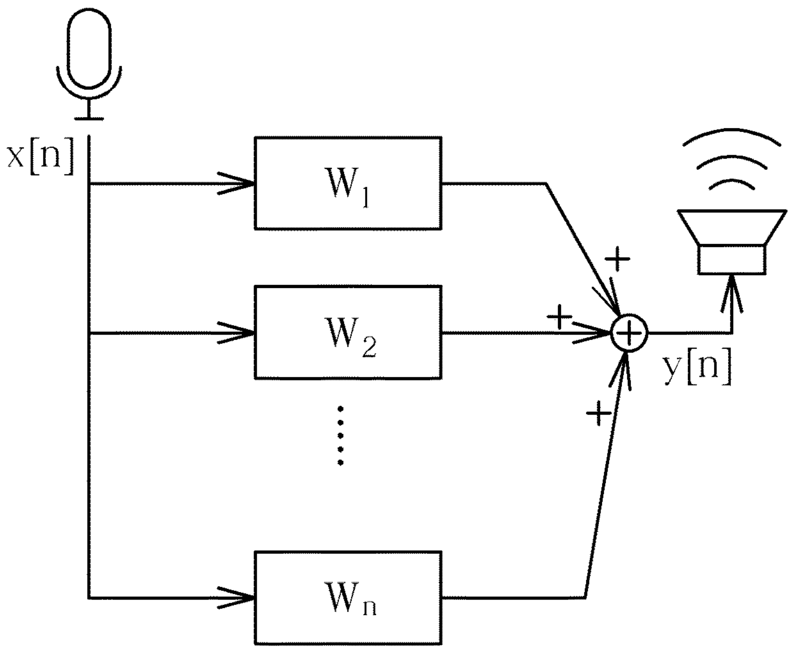
FIG. 2 is a diagram illustrating a concept of a parallel ANC filter design according to an embodiment of the present invention.

FIG. 2 is a diagram illustrating a concept of a parallel ANC filter design according to an embodiment of the present invention. Multiple ANC filters $W_1, W_2, \ldots, W_n$ are connected in a parallel fashion. The ANC filters $W_1$-$W_n$ may be Finite Impulse Response (FIR) or Infinite Impulse Response (IIR) filters. In addition, the number of taps of each ANC filter may be adjusted, depending upon actual design considerations. That is, one of the ANC filters $W_1$-$W_n$ used by the parallel ANC filter design may have a tap number equal to or different from that of another of the ANC filters $W_1$-$W_n$. Hence, the proposed parallel ANC filter design can increase more flexibility with more taps of an ANC filter.

Figure 3:
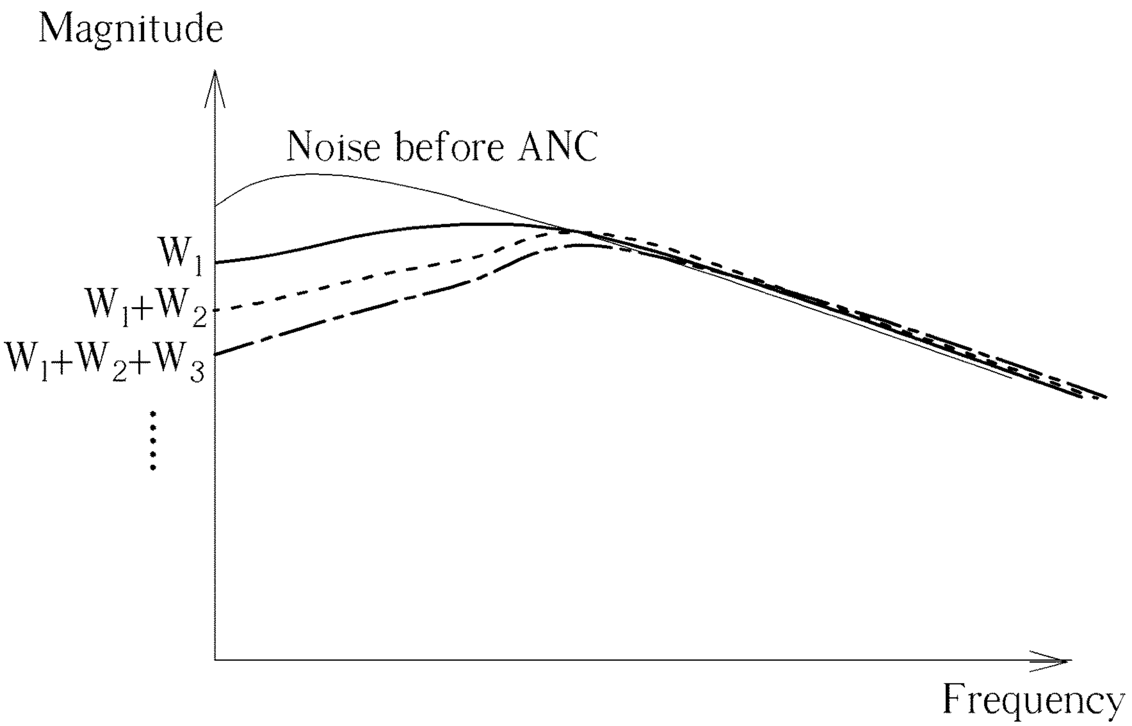
FIG. 3 is a diagram illustrating noise reduction achieved by a transfer function of the parallel ANC filter design during a process of designing multiple ANC filters sequentially.

The anti-noise signal y[n] may be expressed using the following formula: $y[n]=x[n]*(W_1+W_2+\ldots+W_n)=x[n]*W_1+x[n]*W_2+\ldots+x[n]*W_n$. Hence, the anti-noise signal generated by the parallel ANC filter design is conceptually similar to the sum of multiple anti-noise signals, where the ANC filters $W_1$-$W_n$ can be designed jointly or sequentially. FIG. 3 is a diagram illustrating noise reduction achieved by a transfer function of the parallel ANC filter design during a process of designing multiple ANC filters $W_1$-$W_n$ sequentially. To design the ANC filters $W_1$-$W_n$ sequentially, the second and following filters $W_2$-$W_n$ can be designed one by one according to the new transfer function from the residual noise after ANC that is based on previously designed filter(s). In this way, multiple ANC filters can be acquired easily and systematically.

In one exemplary implementation, each of the first filters 110_1-110_N (N≥1) is a part of a static feed-forward (FF) ANC structure employed by the ANC circuit 106, and each of the second filters 112_1-112_M (M≥1) is a part of an adaptive FF ANC structure employed by the ANC circuit 106. That is, the ANC circuit 106 employs an ANC structure which is a combination of a static FF ANC structure and an adaptive FF structure.

In another exemplary implementation, each of the first filters 110_1-110_N (N≥1) is a part of a static feedback (FB) ANC structure employed by the ANC circuit 106, and each of the second filters 112_1-112_M (M≥1) is a part of an adaptive FB ANC structure employed by the ANC circuit 106. That is, the ANC circuit 106 employs an ANC structure which is a combination of a static FB ANC structure and an adaptive FB structure.

It should be noted that the ANC circuit 106 shown in FIG. 1 is for illustrative purposes only, and is not meant to be a limitation of the present invention. Alternatively, the ANC circuit 106 may be modified to include additional ANC filter(s).

Figure 4:
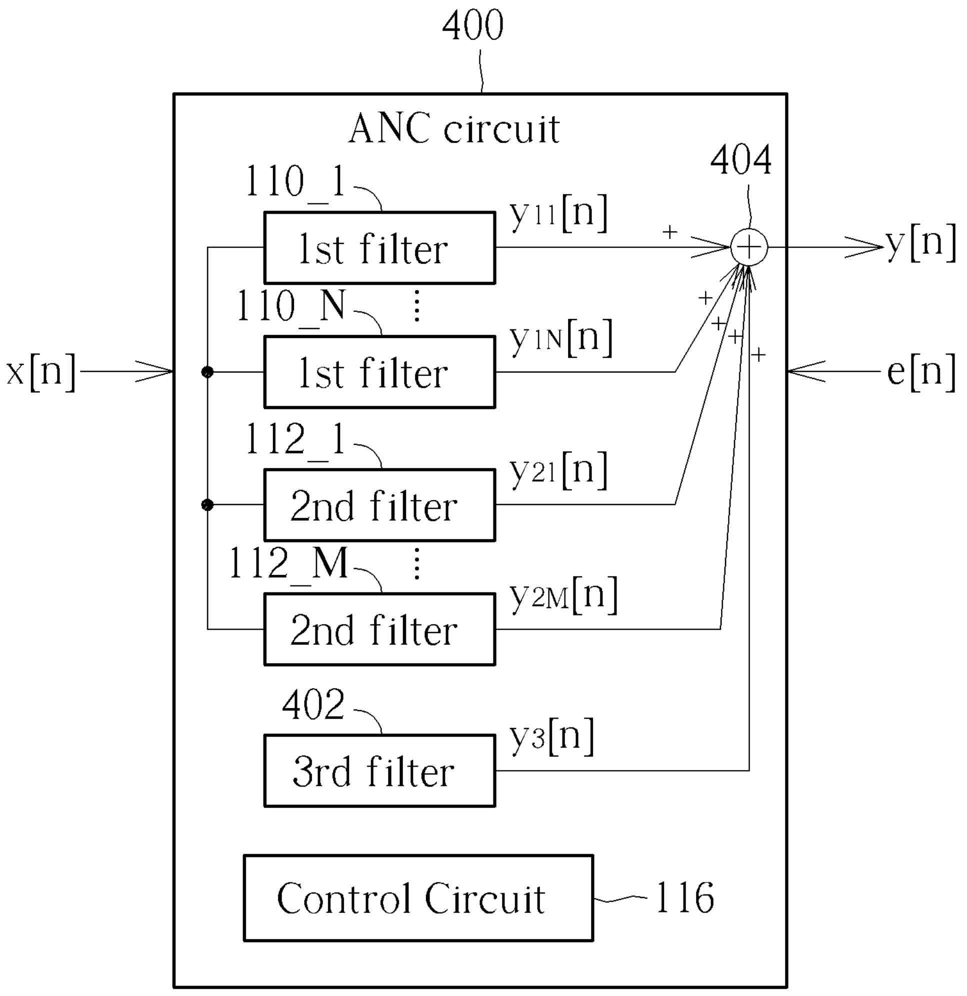
FIG. 4 is a diagram illustrating another ANC circuit according to an embodiment of the present invention.

FIG. 4 is a diagram illustrating another ANC circuit according to an embodiment of the present invention. The ANC circuit 106 shown in FIG. 1 may be replaced with the ANC circuit 400 shown in FIG. 4. The ANC circuit 400 includes the aforementioned first filters 110_1-110_N (N≥1) and second filters 112_1-112_M (M≥1) that are connected in a parallel fashion, and further includes one or more third filters 402. For brevity and simplicity, only a single third filter 402 is shown in FIG. 4. The third filter 402 is arranged to generate a third filter output $y_3[n]$ as an anti-noise output. It should be noted that none of the first filters 110_1-110_N (N≥1) and second filters 112_1-112_M (M≥1) is connected to the third filter 402 in a parallel fashion. In this embodiment, the anti-noise signal y[n] output from the ANC circuit 400 is jointly controlled by the first filter outputs $y_{11}[n]$-$y_{1N}[n]$ (N≥1), the second filter outputs $y_{21}[n]$-$y_{2M}[n]$ (M≥1), and the third filter output $y_3[n]$. For example, the ANC circuit 400 further includes a combining circuit (e.g., an adder) 404 that is arranged to combine the first filter outputs $y_{11}[n]$-$y_{1N}[n]$ (N≥1), the second filter outputs $y_{21}[n]$-$y_{2M}[n]$(M≥1), and the third filter output $y_3[n]$ for generating the anti-noise signal y[n]. In some embodiments of the present invention, each of the first filters 110_1-110_N (N≥1) is a static ANC filter with fixed filter coefficients and fixed frequency response, each of the second filters 112_1-112_M (M≥1) is an adaptive ANC filter with adaptively adjusted filter coefficients and variable frequency response, and the third filter 402 may be a static ANC filter with fixed filter coefficients and fixed frequency response or an adaptive ANC filter adaptively adjusted filter coefficients and variable frequency response. In a case where adaptive ANC filter (s) are used by the ANC circuit 400, the ANC circuit 400 further includes the aforementioned control circuit 116 that is arranged to adaptively adjust filter coefficients of each adaptive ANC filter. For example, the control circuit 116 includes one ANC filter controller for each adaptive ANC filter, and the ANC filter controller may update filter coefficients of the adaptive ANC filter by using an LMS algorithm, an NLMS algorithm, an Fx-LMS algorithm, or an RLS algorithm.

In one exemplary implementation, each of the first filters 110_1-110_N (N≥1) is a part of a static FF ANC structure employed by the ANC circuit 400, each of the second filters 112_1-112_M (M≥1) is a part of an adaptive FF ANC structure employed by the ANC circuit 400, and the third filter 402 is a part of a static FB ANC structure employed by the ANC circuit 400. That is, the ANC circuit 400 employs an ANC structure which is a hybrid ANC structure being a combination of a static FF ANC structure, an adaptive FF structure, and a static FB ANC structure.

In another exemplary implementation, each of the first filters 110_1-110_N (N≥1) is a part of a static FF ANC structure employed by the ANC circuit 400, each of the second filters 112_1-112_M (M≥1) is a part of an adaptive FF ANC structure employed by the ANC circuit 400, and the third filter 402 is a part of an adaptive FB ANC structure employed by the ANC circuit 400. That is, the ANC circuit 400 employs an ANC structure which is a hybrid ANC structure being a combination of a static FF ANC structure, an adaptive FF structure, and an adaptive FB ANC structure.

In another exemplary implementation, each of the first filters 110_1-110_N (N≥1) is a part of a static FB ANC structure employed by the ANC circuit 400, each of the second filters 112_1-112_M (M≥1) is a part of an adaptive FB ANC structure employed by the ANC circuit 400, and the third filter 402 is a part of a static FF ANC structure employed by the ANC circuit 400. That is, the ANC circuit 400 employs an ANC structure which is a hybrid ANC structure being a combination of a static FB ANC structure, an adaptive FB structure, and a static FF structure.

In another exemplary implementation, each of the first filters 110_1-110_N (N≥1) is a part of a static FB ANC structure employed by the ANC circuit 400, each of the second filters 112_1-112_M (M≥1) is a part of an adaptive FB ANC structure employed by the ANC circuit 400, and the third filter 402 is a part of an adaptive FF ANC structure employed by the ANC circuit 400. That is, the ANC circuit 400 employs an ANC structure which is a hybrid ANC structure being a combination of a static FB ANC structure, an adaptive FB structure, and an adaptive FF structure.

As shown in FIG. 1, the ANC circuit 106 has one set of first filters 110_1-110_N (N≥1) and second filters 112_1-112_M (M≥1) that are connected in a parallel fashion. However, this is for illustrative purposes only, and is not meant to be a limitation of the present invention. Alternatively, the ANC circuit 106 may be modified to include more than one set of filters connected in a parallel fashion.

Figure 5:
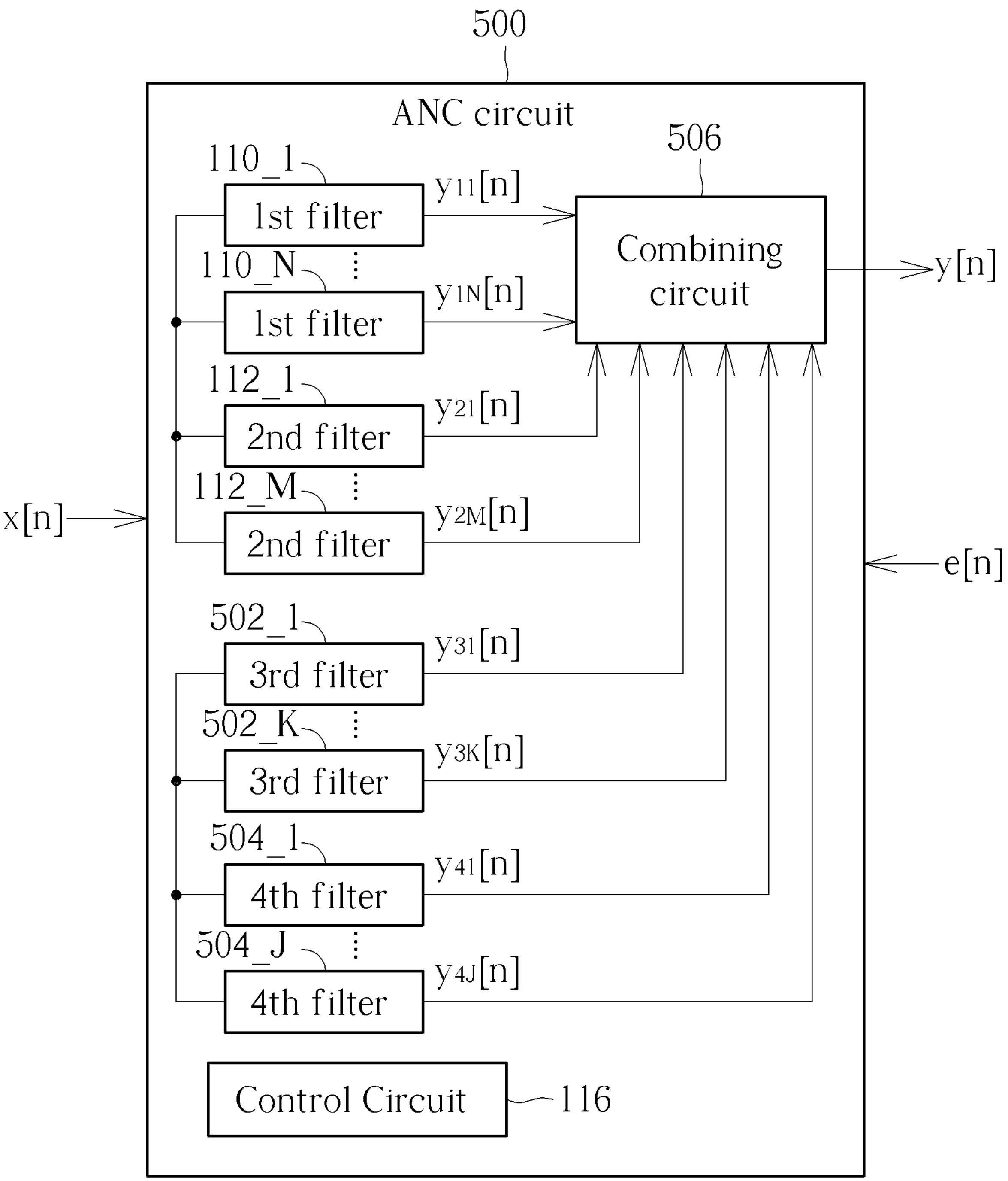
FIG. 5 is a diagram illustrating yet another ANC circuit according to an embodiment of the present invention.

FIG. 5 is a diagram illustrating yet another ANC circuit according to an embodiment of the present invention. The ANC circuit 106 shown in FIG. 1 may be replaced with the ANC circuit 500 shown in FIG. 5. The ANC circuit 500 includes the aforementioned first filters 110_1-110_N (N≥1) and second filters 112_1-112_M (M≥1) that are connected in a parallel fashion, and further includes third filters 502_1-502_K (K≥1) and fourth filters 504_1-504_J (J≥1) that are connected in a parallel fashion, where J and K are positive integers, J may be equal to or different from K. The number of third filters 502_1-502_K and the number of fourth filters 504_1-504_J can be adjusted, depending upon actual design considerations. For example, the ANC circuit 500 may include only a single third filter 502_1 (K=1). For another example, the ANC circuit 500 may include only a single fourth filter 504_1 (J=1). For yet another example, the ANC circuit 500 may include only a single third filter 502_1 (K=1) and only a single fourth filter 504_1 (J=1).

It should be noted that none of the first filters 110_1-110_N (N≥1) and second filters 112_1-112_M (M≥1) is connected to third filters 502_1-502_K (K≥1) or fourth filters 504_1-504_J (J≥1) in a parallel fashion. In addition, each of the first filters 110_1-110_N (N≥1) and the third filters 502_1-502_K (K≥1) has a first filter type, and each of the second filters 112_1-112_M (M≥1) and the fourth filters 504_1-504_J (J≥1) has a second filter type that is different from the first filter type. For example, each of the first filters 110_1-110_N (N≥1) and the third filters 502_1-502_K (K≥1) is a static ANC filter with fixed filter coefficients and fixed frequency response, and each of the second filters 112_1-112_M (M≥1) and the fourth filters 504_1-504_J (J≥1) is an adaptive ANC filter with adaptively adjusted filter coefficients and variable frequency response. In a case where adaptive ANC filter(s) are used by the ANC circuit 500, the ANC circuit 500 further includes the aforementioned control circuit 116 that is arranged to adaptively adjust filter coefficients of each adaptive ANC filter. For example, the control circuit 116 includes one ANC filter controller for each adaptive ANC filter, and the ANC filter controller may update filter coefficients of the adaptive ANC filter by using an LMS algorithm, an NLMS algorithm, an Fx-LMS algorithm, or an RLS algorithm.

The third filters 502_1-502_K (K≥1) are arranged to generate third filter outputs $y_{31}[n]$-$y_{3K}[n]$ (K≥1) as anti-noise outputs, respectively. The fourth filters 504_1-504_J (J≥1) are arranged to generate fourth filter outputs $y_{41}[n]$-$y_{4J}[n]$ (J≥1) as anti-noise outputs, respectively. In this embodiment, the anti-noise signal y[n] output from the ANC circuit 500 is jointly controlled by the first filter outputs $y_{11}[n]$-$y_{1N}[n]$ (N≥1), the second filter outputs $y_{21}[n]$-$y_{2M}[n]$ (M≥1), the third filter outputs $y_{31}[n]$-$y_{3K}[n]$ (K≥1), and the fourth filter outputs $y_{41}[n]$-$y_{4J}[n]$ (J≥1). For example, the ANC circuit 500 further includes a combining circuit (e.g., an adder) 506 that is arranged to combine the first filter outputs $y_{11}[n]$-$y_{1N}$ [n] (N≥1), the second filter outputs $y_{21}[n]$-$y_{2M}[n]$ (M≥1), the third filter outputs $y_{31}[n]$-$y_{3K}[n]$ (K≥1), and the fourth filter outputs $y_{41}[n]$-$y_{4J}[n]$ (J≥1) for generating the anti-noise signal y[n].

In one exemplary implementation, each of the first filters 110_1-110_N (N≥1) is a part of a static FF ANC structure employed by the ANC circuit 500, each of the second filters 112_1-112_M (M≥1) is a part of an adaptive FF ANC structure employed by the ANC circuit 500, each of the third filters 502_1-502_K (K≥1) is a part of a static FB ANC structure employed by the ANC circuit 500, and each of the fourth filters 504_1-504_J (J≥1) is a part of an adaptive FB ANC structure employed by the ANC circuit 500. That is, the ANC circuit 500 employs an ANC structure which is a hybrid ANC structure being a combination of a static FF ANC structure, an adaptive FF structure, a static FB ANC structure, and an adaptive FB ANC structure.

For better comprehension of technical features of the present invention, several ANC system examples are provided as below with reference to the accompanying drawings.

Figure 6:
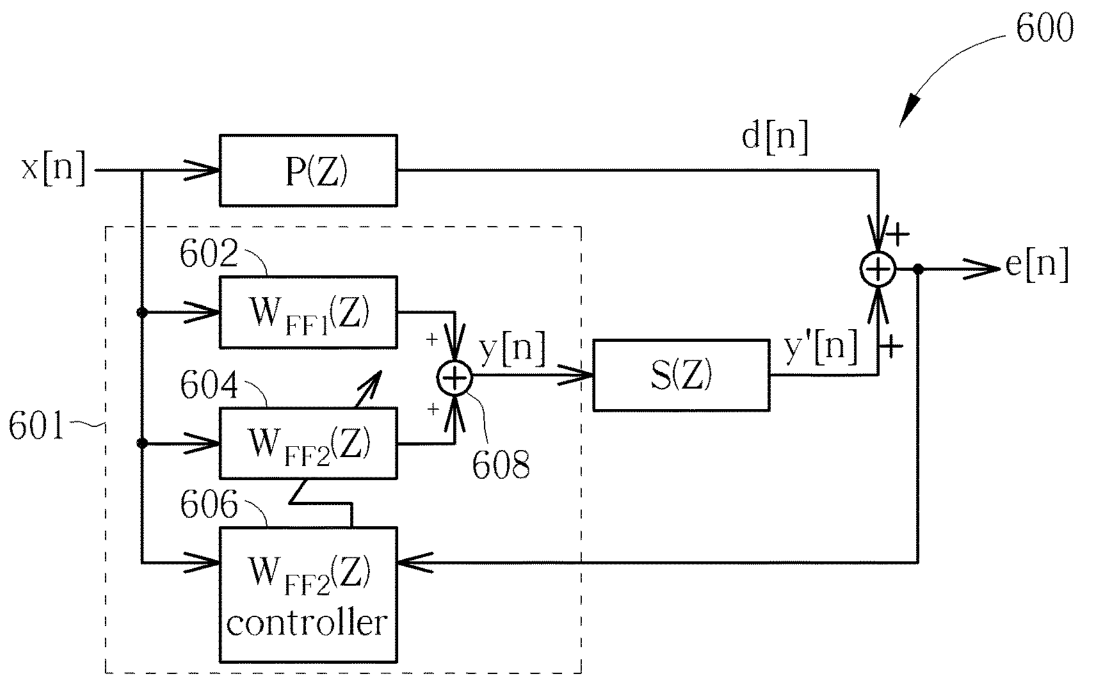
FIG. 6 is a diagram illustrating a first ANC system with a parallel ANC filter design according to an embodiment of the present invention.

FIG. 6 is a diagram illustrating a first ANC system with a parallel ANC filter design according to an embodiment of the present invention. The ANC system 600 includes an ANC circuit 601. The ANC circuit 601 may be implemented on the basis of the parallel ANC filter structure shown in FIG. 1. In this embodiment, the ANC circuit 601 includes a static ANC filter 602 with a transfer function $W_{FF1}(z)$, an adaptive ANC filter 604 with a transfer function $W_{FF2}(z)$, an ANC filter controller (labeled by "$W_{FF2}(z)$ controller") 606, and a combination circuit 608, where the transfer function $W_{FF2}(z)$ is defined by filter coefficients that are adaptively adjusted by the ANC filter controller 606. The transfer function of an acoustic channel, also called the primary path, between the reference signal x[n] (which includes sample values indicative of the ambient noise picked up by the reference microphone 102) and a noise signal d[n] at a position where noise reduction/cancellation occurs is represented by P(z). To put it in another way, the primary path with the transfer function P(z) represents an acoustic path between the reference microphone 102 and the error microphone 104. The transfer function of an electro-acoustic channel, also called the secondary path, between the anti-noise signal y[n] (which is an output of the ANC circuit 601) and the error signal e[n] (which is the remnant noise picked by the error microphone 104) is represented by S(z). To put it in another way, the secondary path with the transfer function S(z) represents an electro-acoustic path between the cancelling loudspeaker input (i.e., anti-noise output of ANC circuit 601) and the error microphone output. As shown in FIG. 6, a signal y'[n] may result from passing the anti-noise signal y[n] through the secondary path transfer function S(z). Since definitions of the transfer functions P(z) and S(z) and fundamental principles of active noise control are known to those skilled in the pertinent art, further description is omitted here for brevity.

In this embodiment, the ANC circuit 601 employs an ANC structure which is a combination of a static FF ANC structure and an adaptive FF ANC structure, where the static ANC filter 602 is a part of the static FF ANC structure, the adaptive ANC filter 604 is a part of the adaptive FF ANC structure, the static ANC filter 602 and the adaptive ANC filter 604 are connected in a parallel fashion, and the combining circuit 608 combines filter outputs of the static ANC filter 602 and the adaptive ANC filter 604 to generate the anti-noise signal y[n].

Figure 7:
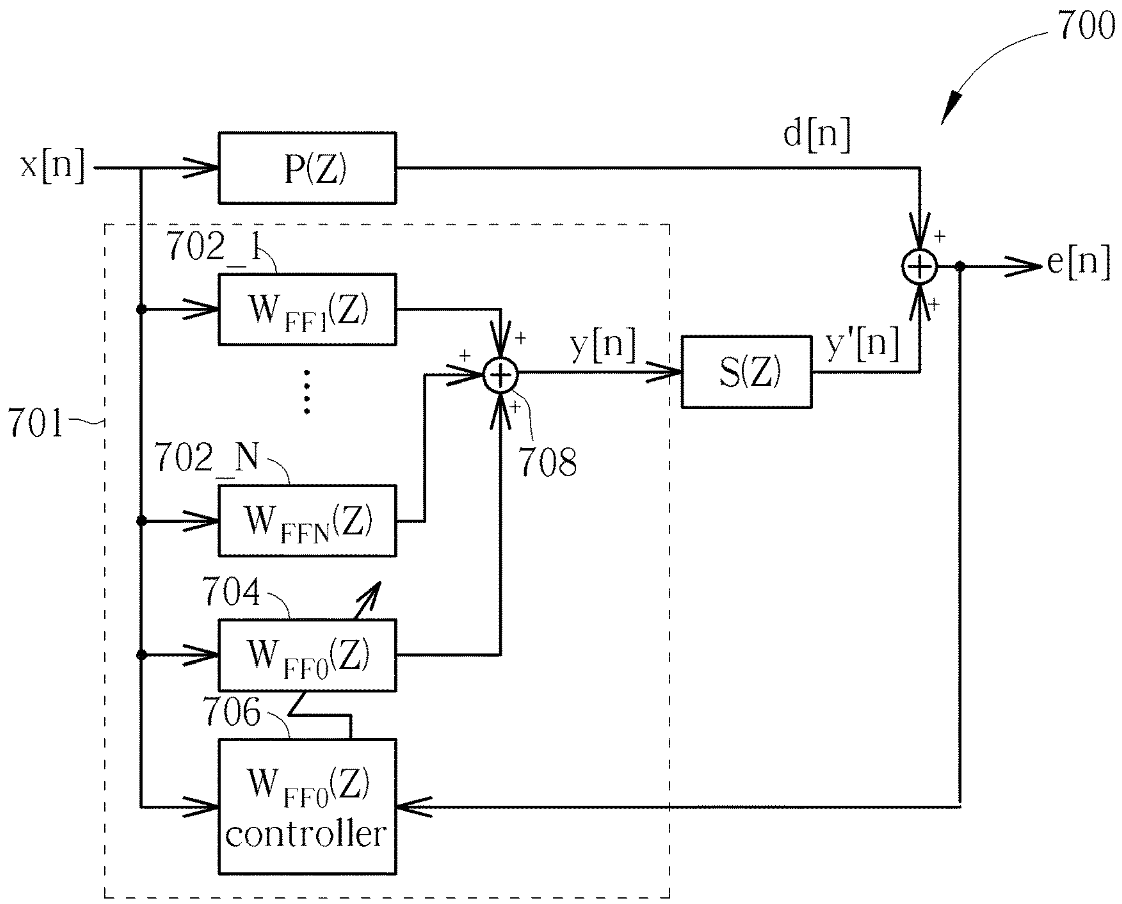
FIG. 7 is a diagram illustrating a second ANC system with a parallel ANC filter design according to an embodiment of the present invention.

FIG. 7 is a diagram illustrating a second ANC system with a parallel ANC filter design according to an embodiment of the present invention. The ANC system 700 includes an ANC circuit 701. The ANC circuit 701 may be implemented on the basis of the parallel ANC filter structure shown in FIG. 1. In this embodiment, the ANC circuit 701 includes a plurality of static ANC filters 702_1-702_N with transfer functions $W_{FF1}(z)$-$W_{FFN}(z)$, an adaptive ANC filter 704 with a transfer function $W_{FF0}(z)$, and an ANC filter controller (labeled by "$W_{FF0}(z)$ controller") 706, and a combination circuit 708, where the transfer function $W_{FF0}(z)$ is defined by filter coefficients that are adaptively adjusted by the ANC filter controller 706. In this embodiment, the ANC circuit 701 employs an ANC structure which is a combination of a static FF ANC structure and an adaptive FF ANC structure, where each of the static ANC filters 702_1-702_N is a part of the static FF ANC structures, the adaptive ANC filter 704 is a part of the adaptive FF ANC structure, the static ANC filters 702_1-702_N and the adaptive ANC filter 704 are connected in a parallel fashion, and the combining circuit 708 combines filter outputs of the static ANC filters 702_1-702_N and the adaptive ANC filter 704 to generate the anti-noise signal y[n].

Figure 8:
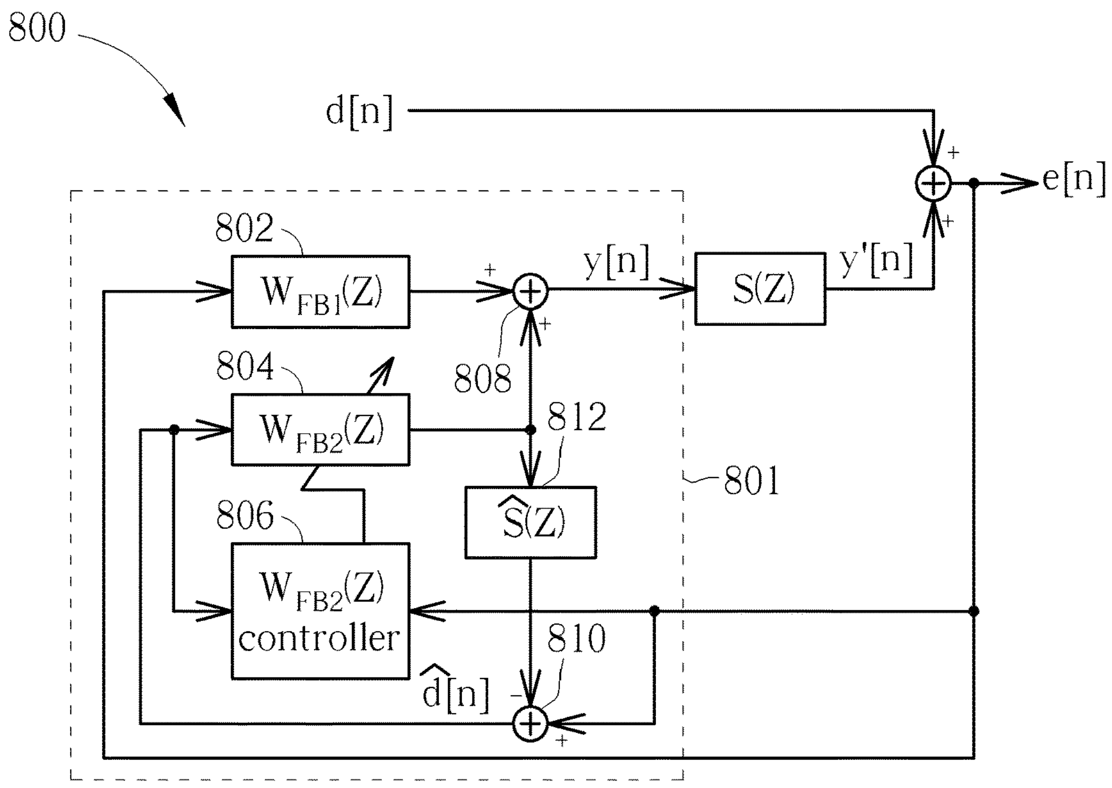
FIG. 8 is a diagram illustrating a third ANC system with a parallel ANC filter design according to an embodiment of the present invention.

FIG. 8 is a diagram illustrating a third ANC system with a parallel ANC filter design according to an embodiment of the present invention. The ANC system 800 includes an ANC circuit 801. The ANC circuit 801 may be implemented on the basis of the parallel ANC filter structure shown in FIG. 1. In this embodiment, the ANC circuit 801 includes a static ANC filter 802 with a transfer function $W_{FB1}(z)$, an adaptive ANC filter 804 with a transfer function $W_{FB2}(z)$, and an ANC filter controller (labeled by "$W_{FB2}(z)$ controller") 806, combination circuits 808, 810, and a filter 812, where the transfer function $W_{FB2}(z)$ is defined by filter coefficients that are adaptively adjusted by the ANC filter controller 806. In this embodiment, the ANC circuit 801 employs an ANC structure which is a combination of a static FB ANC structure and an adaptive FB ANC structure, where the static ANC filter 802 is a part of the static FB ANC structure, the adaptive ANC filter 804 is a part of the adaptive FB ANC structure, the static ANC filter 802 and the adaptive ANC filter 804 are connected in a parallel fashion, and the combining circuit 808 combines filter outputs of the static ANC filter 802 and the adaptive ANC filter 804 to generate the anti-noise signal y[n]. The filter 812 has a transfer function $\hat{S}(z)$ which is an estimation of the second path transfer function S(z). In this feedback structure, the filter 812 and the combining circuit 810 are jointly used for generating an estimated signal $\partial[n]$ from the measured error signal e [n], wherein the estimated signal $\partial[n]$ represents an estimation of d[n] (d[n]=P(z)*x[n], where P(z) is unknown).

Figure 9:
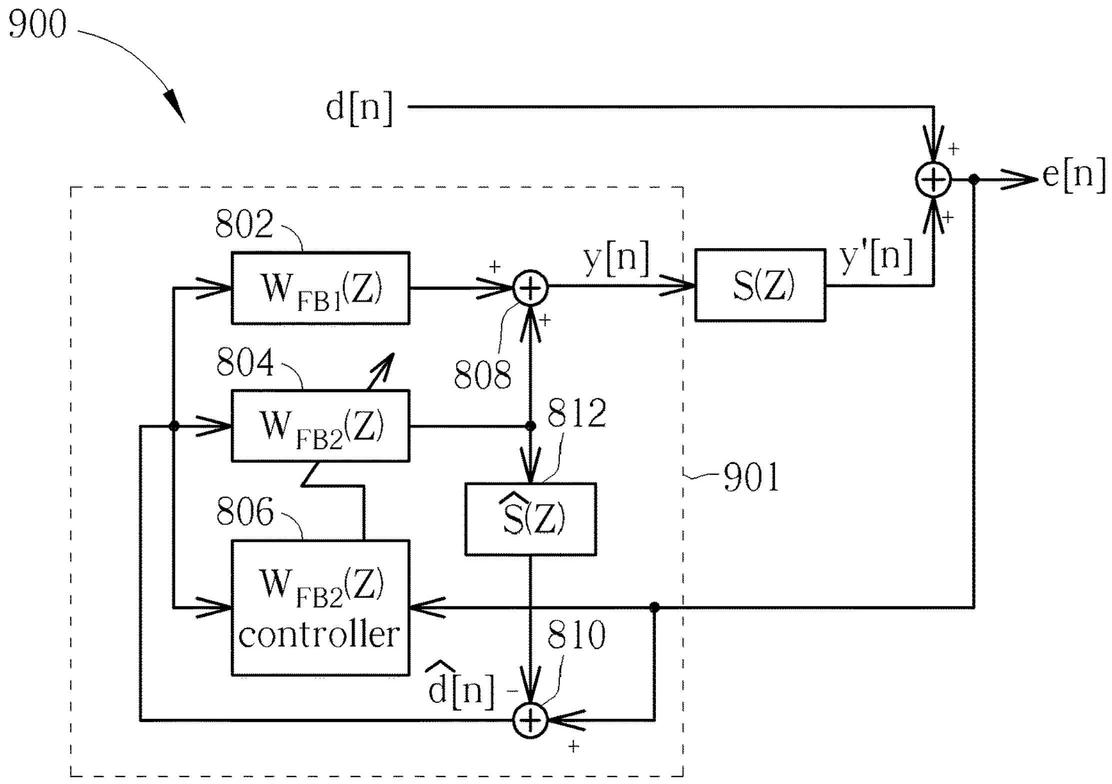
FIG. 9 is a diagram illustrating a fourth ANC system with a parallel ANC filter design according to an embodiment of the present invention.

FIG. 9 is a diagram illustrating a fourth ANC system with a parallel ANC filter design according to an embodiment of the present invention. The ANC system 900 includes an ANC circuit 901. The ANC circuit 901 may be implemented on the basis of the parallel ANC filter structure shown in FIG. 1. The major difference between the ANC circuits 801 and 901 is that a configuration of the static FB ANC structure employed by the ANC circuit 901 is different from a configuration of the static FB ANC structure employed by the ANC circuit 801. In further detail, an input signal of the static ANC filter 802 in FIG. 9 is the estimated signal ∂[n], different from that in FIG. 8 being the error signal e[n].

Figure 10:
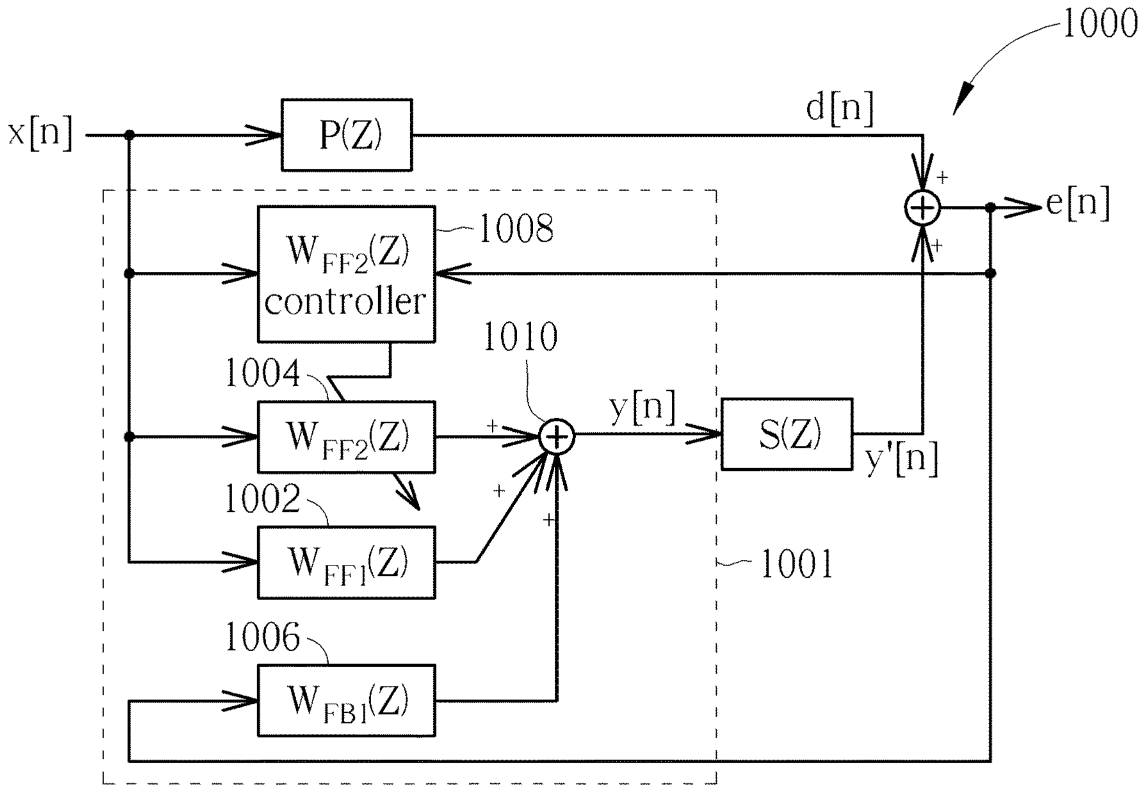
FIG. 10 is a diagram illustrating a fifth ANC system with a parallel ANC filter design according to an embodiment of the present invention.

FIG. 10 is a diagram illustrating a fifth ANC system with a parallel ANC filter design according to an embodiment of the present invention. The ANC system 1000 includes an ANC circuit 1001. The ANC circuit 1001 may be implemented on the basis of the parallel ANC filter structure shown in FIG. 4. In this embodiment, the ANC circuit 1001 includes a static ANC filter 1002 with a transfer functions $W_{FF1}(z)$, an adaptive ANC filter 1004 with a transfer function $W_{FF2}(z)$, a static ANC filter 1006 with a transfer functions $W_{FB1}(z)$, and an ANC filter controller (labeled by "$W_{FF2}(z)$ controller") 1008, and a combination circuit 1010, where the transfer function $W_{FF2}(z)$ is defined by filter coefficients that are adaptively adjusted by the ANC filter controller 1008. In this embodiment, the ANC circuit 1001 employs an ANC structure which is a hybrid ANC structure being a combination of a static FF ANC structures, an adaptive FF ANC structure, and a static FB ANC structure, where the static ANC filter 1002 is a part of the static FF ANC structure, the adaptive ANC filter 1004 is a part of the adaptive FF ANC structure, and the static ANC filter 1006 is a part of the static FB ANC structure, the static ANC filter 1002 and the adaptive ANC filter 1004 are connected in a parallel fashion, and the combining circuit 1010 combines filter outputs of the static ANC filters 1002, 1006 and the adaptive ANC filter 1004 to generate the anti-noise signal y[n].

Figure 11:
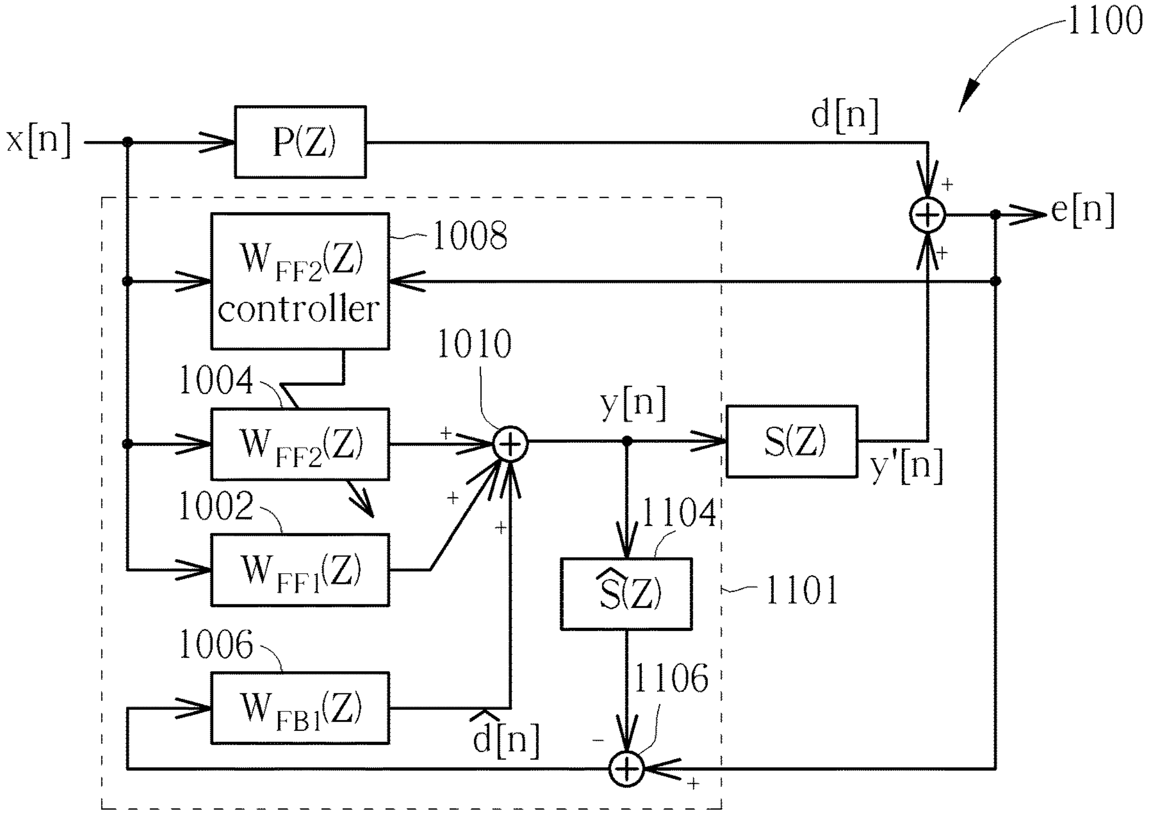
FIG. 11 is a diagram illustrating a sixth ANC system with a parallel ANC filter design according to an embodiment of the present invention.

FIG. 11 is a diagram illustrating a sixth ANC system with a parallel ANC filter design according to an embodiment of the present invention. The ANC system 1100 includes an ANC circuit 1101. The ANC circuit 1101 may be implemented on the basis of the parallel ANC filter structure shown in FIG. 4. The major difference between the ANC circuits 1001 and 1101 is that a configuration of the static FB ANC structure employed by the ANC circuit 1101 is different from a configuration of the static FB ANC structure employed by the ANC circuit 1001. Specifically, the ANC circuit 1101 further includes a filter 1104 with a transfer function $\hat{S}(z)$ (which is an estimation of the second path transfer function S(z)) and a combining circuit 1106. The filter 1104 and the combining circuit 1106 are jointly used for generating an estimated signal ∂[n] from the measured error signal e[n], wherein the estimated signal ∂[n] represents an estimation of d[n] (d[n]=P(z)*x[n], where P(z) is unknown).

Figure 12:
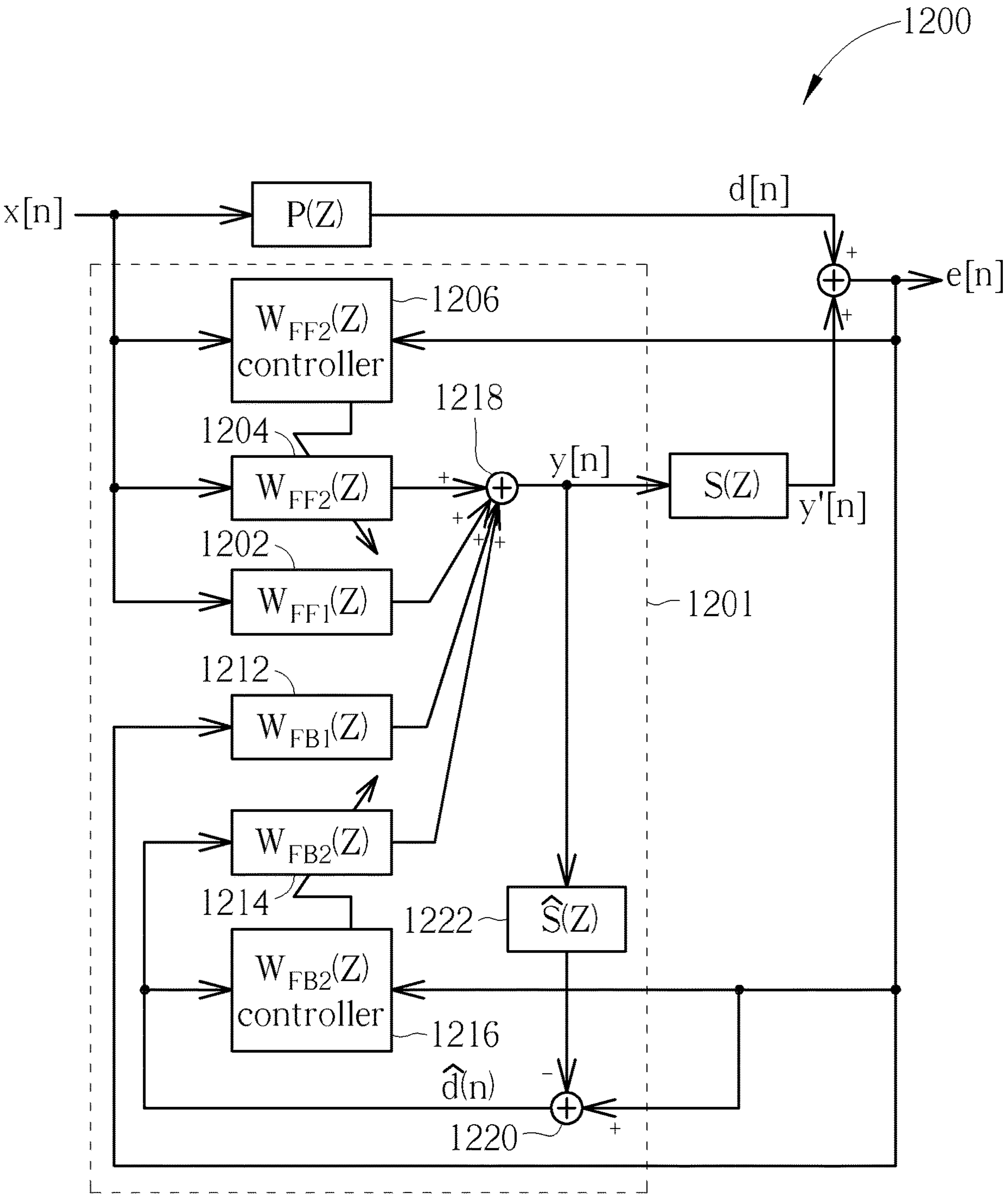
FIG. 12 is a diagram illustrating a seventh ANC system with a parallel ANC filter design according to an embodiment of the present invention.

FIG. 12 is a diagram illustrating a seventh ANC system with a parallel ANC filter design according to an embodiment of the present invention. The ANC system 1200 includes an ANC circuit 1201. The ANC circuit 1201 may be implemented on the basis of the parallel ANC filter structure shown in FIG. 5. In this embodiment, the ANC circuit 1201 includes a static ANC filter 1202 with a transfer functions $W_{FF1}(z)$, an adaptive ANC filter 1204 with a transfer function $W_{FF2}$ Z), an ANC filter controller (labeled by "$W_{FF2}(z)$ controller") 1206, a static ANC filter 1212 with a transfer functions $W_{FB1}(z)$, an adaptive ANC filter 1214 with a transfer function $W_{FB2}(z)$, an ANC filter controller (labeled by "$W_{FB2}(z)$ controller") 1216, combination circuits 1218, 1220, and a filter 1222, where the transfer function $W_{FF2}(z)$ is defined by filter coefficients that are adaptively adjusted by the ANC filter controller 1206, and the transfer function $W_{FB2}(z)$ is defined by filter coefficients that are adaptively adjusted by the ANC filter controller 1216. In this embodiment, the ANC circuit 1001 employs an ANC structure which is a hybrid ANC structure being a combination of a static FF ANC structure, an adaptive FF ANC structure, a static FB ANC structure, and an adaptive FB ANC structure, where the static ANC filter 1202 is a part of the static FF ANC structure, the adaptive ANC filter 1204 is a part of the adaptive FF ANC structure, the static ANC filter 1212 is a part of the static FB ANC structure, and the adaptive ANC filter 1214 is a part of the adaptive FB ANC structure, the static ANC filter 1202 and the adaptive ANC filter 1204 are connected in a parallel fashion, the static ANC filter 1212 and the adaptive ANC filter 1214 are connected in a parallel fashion, and the combining circuit 1218 combines filter outputs of the static ANC filters 1202, 1212 and the adaptive ANC filters 1204, 1214 to generate the anti-noise signal y[n]. Furthermore, the filter 1222 (which has a transfer function $\hat{S}(z)$ being an estimation of the second path transfer function S(z)) and the combining circuit 1220 are jointly used for generating an estimated signal ∂[n] from the measured error signal e[n], wherein the estimated signal ∂[n] represents an estimation of d[n] (d[n]=P(z)*x[n], where P(z) is unknown).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An active noise control (ANC) circuit for generating an anti-noise signal, comprising:

a plurality of filters, comprising:

at least one first filter, arranged to generate at least one first filter output, wherein each of the at least one first filter has a first filter type; and at least one second filter, arranged to generate at least one second filter output, wherein each of the at least one second filter has a second filter type different from the first filter type;

wherein the anti-noise signal is jointly controlled by the at least one first filter output and the at least one second filter output; and the at least one first filter and the at least one second filter are connected in a parallel fashion, and filter inputs processed by the at least one first filter and the at least one second filter are derived from a same microphone.

2. The ANC circuit of claim 1, wherein each of the at least one first filter is a static filter, and each of the at least one second filter is an adaptive filter.

3. The ANC circuit of claim 2, wherein the at least one first filter is a part of a static feed-forward ANC structure employed by the ANC circuit, and the at least one second filter is a part of an adaptive feed-forward ANC structure employed by the ANC circuit.

4. The ANC circuit of claim 3, wherein the plurality of filters further comprise:

at least one third filter, arranged to generate at least one third filter output, wherein the anti-noise signal is jointly controlled by the at least one first filter output, the at least one second filter output, and the at least one third filter output; and the at least one third filter is a part of a feedback ANC structure employed by the ANC circuit.

5. The ANC circuit of claim 4, wherein each of the at least one third filter is a static filter, and the feedback ANC structure is a static feedback ANC structure.

6. The ANC circuit of claim 4, wherein each of the at least one third filter is an adaptive filter, and the feedback ANC structure is an adaptive feedback ANC structure.

7. The ANC circuit of claim 2, wherein the at least one first filter is a part of a static feedback ANC structure employed by the ANC circuit, and the at least one second filter is a part of an adaptive feedback ANC structure employed by the ANC circuit.

8. The ANC circuit of claim 7, wherein the plurality of filters further comprise:

at least one third filter, arranged to generate at least one third filter output, wherein the anti-noise signal is jointly controlled by the at least one first filter output, the at least one second filter output, and the at least one third filter output; and the at least one third filter is a part of a feed-forward ANC structure employed by the ANC circuit.

9. The ANC circuit of claim 8, wherein each of the at least one third filter is a static filter, and the feed-forward ANC structure is a static feed-forward ANC structure.

10. The ANC circuit of claim 8, wherein each of the at least one third filter is an adaptive filter, and the feed-forward ANC structure is an adaptive feed-forward ANC structure.

11. The ANC circuit of claim 1, wherein the plurality of filters further comprise:

at least one third filter, arranged to generate at least one third filter output, wherein each of the at least one third filter has the first filter type; and at least one fourth filter, arranged to generate at least one fourth filter output, wherein each of the at least one fourth filter has the second filter type;

wherein the anti-noise signal is jointly controlled by the at least one first filter output, the at least one second filter output, the at least one third filter output, and the at least one fourth filter output; the at least one third filter and the at least one fourth filter are connected in a parallel fashion; and none of the at least one first filter and the at least one second filter is connected to the at least one third filter or the at least one fourth filter in a parallel fashion.

12. The ANC circuit of claim 11, wherein each of the at least one first filter and the at least one third filter is a static filter, and each of the at least one second filter and the at least one fourth filter is an adaptive filter.

13. The ANC circuit of claim 12, wherein the at least one first filter is a part of a static feed-forward ANC structure employed by the ANC circuit, the at least one second filter is a part of an adaptive feed-forward ANC structure employed by the ANC circuit, the at least one third filter is a part of a static feedback ANC structure employed by the ANC circuit, the at least one fourth filter is a part of an adaptive feedback ANC structure employed by the ANC circuit.

14. An active noise control (ANC) method for generating an anti-noise signal, comprising:

utilizing at least one first filter and at least one second filter connected in a parallel fashion to obtain at least one first filter output of the at least one first filter and at least one second filter output of the at least one second filter, wherein filter inputs processed by the at least one first filter and the at least one second filter are derived from a same microphone, each of the at least one first filter has a first filter type, and each of the at least one second filter has a second filter type different from the first filter type; and generating the anti-noise signal by combining the at least one first filter output and the at least one second filter output.

15. The ANC method of claim 14, wherein each of the at least one first filter is a static filter, and each of the at least one second filter is an adaptive filter.

16. The ANC method of claim 15, wherein the at least one first filter is a part of a static feed-forward ANC structure, and the at least one second filter is a part of an adaptive feed-forward ANC structure.

17. The ANC method of claim 15, wherein the at least one first filter is a part of a static feedback ANC structure, and the at least one second filter is a part of an adaptive feedback ANC structure.

18. The ANC method of claim 14, further comprising:

utilizing at least one third filter and at least one fourth filter connected in a parallel fashion to obtain at least one third filter output of the at least one third filter and at least one fourth filter output of the at least one fourth filter;

wherein each of the at least one third filter has the first filter type; each of the at least one fourth filter has the second filter type; none of the at least one first filter and the at least one second filter is connected to the at least one third filter or the at least one fourth filter in a parallel fashion; and generating the anti-noise signal comprises:

combining the at least one first filter output, the at least one second filter output, the at least one third filter output, and the at least one fourth filter output, to generate the anti-noise signal.

19. The ANC method of claim 18, wherein each of the at least one first filter and the at least one third filter is a static filter, and each of the at least one second filter and the at least one fourth filter is an adaptive filter.

* * * * *